Jan. 13, 1959 H. E. CRAWFORD 2,868,124
PROCESS FOR PREPARING RELIEF IMAGES
Filed April 4, 1956
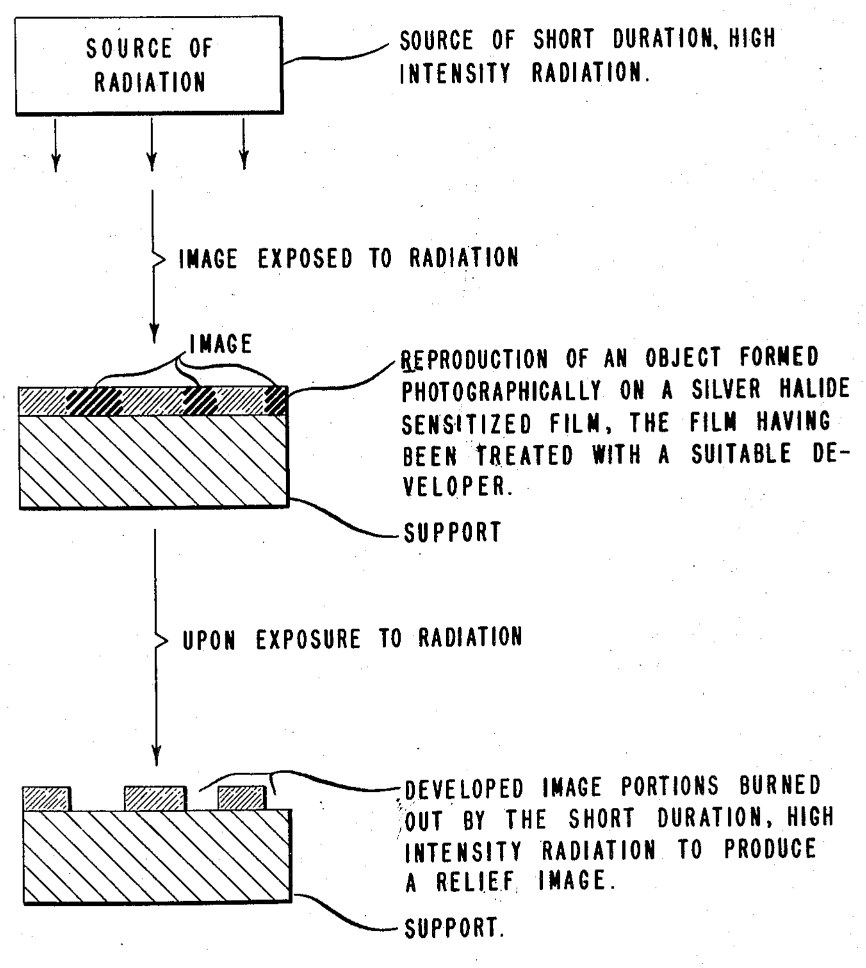
INVENTOR
HARRY EDWARD CRAWFORD
BY John Ellsworth Griffiths
ATTORNEY United States Patent Office 2,868,124

Patented Jan. 13, 1959

2,868,124

PROCESS FOR PREPARING RELIEF IMAGES

Harry Edward Crawford, Red Bank, N. J., assignor to E. I. du Pont de Nemours and Company, Wilmington, Del., a corporation of Delaware Application April 4, 1956, Serial No. 575,951

8 Claims. (Cl. 101—401.1)

This invention relates to a process for preparing relief images. More particularly, it relates to a process for preparing printing relief images directly from a photographic element by subjecting the element to the radiation of a short duration, high intensity source. Still more particularly, it relates to such a process wherein the photographic element comprises a developed silver image in a water-permeable organic binding agent. It also relates to such a process wherein said element is subjected to electronic flash radiation whereby the silver image flash-vaporizes.

Relief printing elements have been prepared by various methods. One such method involves differential shrinkage of exposed and unexposed areas of the emulsion by special processing solutions. This procedure, of course, has the disadvantages of requiring the preparation and use of special processing solutions and resulting in relief images wherein small craters appear in the tops of the raised portions of the images causing uneven printing of the raised portions. Another disadvantage of this prior art method is particularly apparent in reproduction of half-tone images wherein the printing element has shadow dots lower than highlight dots. Another known method of preparing relief image printing elements requires the action of a solvent for the unexposed portions of the emulsion to produce a relief image.

It is an object of this invention to provide new processes for producing relief images. Another object is to provide a simple, rapid, and economical process for producing such images. An additional object is to provide such a process which does not require special processing solutions or solvents. A specific object of this invention is to provide new processes for producing printing reliefs suitable for use as letterpress or dry-offset printing elements. Another specific object is to provide such a process for producing printing reliefs suitable for use as intaglio or gravure printing elements. Yet another specific object is to provide such a process for producing stencils suitable for use in silk screen or similar processes. An additional specific object is to provide such a process for producing relief image elements suitable for use as acid resists for preparation of printing plates. Still other objects will be apparent from the following description of the invention.

It has been found that relief images useful for printing purposes can be prepared by subjecting a photographic element comprising an emulsion layer of a water-permeable organic binding agent containing a developed silver image to radiation from a short duration, high intensity source, e. g., a stroboscopic lamp or similar electronic flash source. The photographic element may be a single layer of a water-permeable organic binding agent containing a developed silver image, or it may be a photographic negative or positive, such as an image-bearing transparency wherein the image-bearing layer contains substantially opaque areas of developed silver and substantially transparent areas where the opaque areas are substantially of the same optical density. The developed silver image has been obtained by exposing the photographic element to an object field, causing the light-sensitive layer to receive a photographic latent image which is subsequently processed in a photographic developer, and perhaps in a photographic fixer, according to procedures well known in the art.

The exposure to the short duration, high intensity source causes a "burning out" of the emulsion layer at the places where developed silver deposits existed, and the immediate result is a relief image element having holes or depressions in the emulsion corresponding to the transparency image. This single step produces the relief image element which can be used directly as a stencil or printing element.

The radiation source utilized in this invention can be of the type known variously as a stroboscopic lamp, strobe light, or electronic flash unit, wherein the radiation is emitted by what is known as a flash or strobe tube. These electronic flash units typically emit radiant energy, which comprises both heat and light, for a duration varying in the range from 100 microseconds or shorter to 10,000 microseconds or longer. Radiant energy that comprises both heat and light can of course, if desired for convenience, be expressed in terms of the wavelength of the radiation encompassed within this range, and inspection of the electromagnetic spectrum indicates that a range of wavelengths from approximately 3,000 A. to approximately 26,000 A. corresponds to the aforementioned radiant energy. They typically have energy inputs ranging up to 50,000 watt-seconds, giving luminous energy values up to 33,000,000 lumen-seconds and peak emission intensity values as high as 300 million to 1 billion lumens or higher.

It is believed that energy from the source is absorbed by the developed silver deposits in the image-bearing photographic element and the temperature of the silver image areas is increased practically instantaneously to a point where the silver and binder of the image areas are burned out and vaporized. Any short duration, high intensity source exhibiting the general characteristics described above is considered suitable for practicing the present invention.

The exposure can take place in one or a multiple of flashes, the number of which will vary depending on such factors as the distance from the radiation source to the developed silver image-bearing element, the number of sources, intensity of radiation source, flash duration, interval between flashes, emulsion thickness, silver density in the emulsion, type of binder, intervening layers, etc. Each of these variables is not of itself critical as long as they combine to effect the emulsion burn-out. In any given case, the specific conditions will be readily ascertained by one skilled in the art by following the teachings of this invention as fully set forth herein.

One representative embodiment of the present invention is illustrated in the accompanying drawing in schematic cross-section, the elements and layer thickness shown in exaggerated enlargement for purposes of clarity and not necessarily shown to scale. The legends appearing in the drawing are self-explanatory.

A preferred embodiment of this invention comprises the use of a conventional lithographic process negative transparency as the image-bearing photographic element wherein the image is in a half-tone dot or line pattern. The process negative transparency containing the developed silver image is exposed to the short duration, high intensity radiation source, according to this invention, and the immediate effect is a relief image element having holes in the emulsion in halftone dot or line pattern corresponding to the image in the negative transparency. Letterpress printing with this relief element will produce a positive copy of the negative image which appeared in the line or half-tone lithographic process negative transparency.

Another specific embodiment of this invention comprises the use of a process positive transparency as the image-bearing photographic element wherein the image is in a half-tone dot or line pattern. The process positive transparency is exposed to the short duration, high intensity source, according to this invention, and the immediate product is a relief image element having holes or depressions in the emulsion in half-tone dot or line pattern corresponding to the image in the positive transparency. This relief image element can be used directly as a printing element in an intaglio or gravure procedure wherein printing ink is applied over the surface of the relief element thus filling the depressions in the element. This is followed by squeegeeing ink from the raised portions of the relief image and printing in the customary manner, resulting in a positive copy of the image in the process positive transparency. The relief elements of this and the preferred embodiment can also be used as acid resists in the preparation of engraved printing plates by procedures well known in the printing art.

Yet another embodiment involves the use of a stripping film wherein the image in the emulsion layer of the process negative or positive photographic element is burned out, according to the invention, through the entire thickness of the emulsion layer. The emulsion layer then is a stencil which can be applied to a silk screen after which the film base can be stripped away from the emulsion layer and discarded. The emulsion layer then serves as a stencil image for the application of paints or inks to various surfaces according to well known procedures.

The invention will be further illustrated but is not intended to be limited by the following examples.

*Example I*

A photographic film element having a layer of a negative gelatino-silver chloride/silver bromide emulsion of the lithographic type with a silver halide coating weight of 72 mg. per square decimeter and an emulsion thickness of 0.3 to 0.4 mil coated on a cellulose acetate base is made to receive a latent negative image by exposure in a process camera to a white flame carbon arc light source through a halftone screen (133 lines per inch) and continuous tone positive transparency of the desired image, followed by development in a high contrast lithographic developer. The negative is placed emulsion side up between two pieces of 1/4 inch thick "Water White" plate glass having high ultraviolet transmission. It is then subjected from above to ten flashes, each having a duration of approximately 1/1800 of a second, at intervals of about 30 seconds from a 3200 watt-second electronic flash unit having as a source tube a General Electric FT–503 arc with a rated energy value of 2,250,000 lumen-seconds and a peak emission intensity value of approximately 225,000,000 lumens, positioned at a distance of 7 inches from the negative. Upon removal of the film from the glass plates, examination of the negative shows the gelatin emulsion at each negative half-tone dot to have burned out, resulting in holes corresponding to the dots forming the developed silver negative half-tone image. The edges of these holes are sharp or clean cut, and the burn out extends all the way to the cellulose acetate suport. The burned out process negative is employed as the printing element on a Vandercook proof press. The printing is by direct impression with letterpress ink and the plate is used dry with no attempt being made to swell the gelatin layer before or during printing. Examination of the resulting print indicates the complete tonal range to be present.

*Example II*

Example I is repeated except that the film base is polyethylene terephthalate approximately 5 mils in thickness. The resultant elements and prints made therefrom have the same excellent characteristics and high qualities as obtained in Example I.

*Example III*

A half-tone image-bearing process negative is prepared by the procedure described in Example I, except that the half-tone screen has 65 lines per inch, from a photographic film as described in Example I. The negative is placed emulsion side up on a flat surface. It is then subjected from above to four flashes, each having a duration of approximately 1/1200 of a second, at intervals of about 30 seconds, from a 4000 watt-second electronic flash unit having as a source tube a General Electric FT–503 arc with a rated energy value of 2,680,000 lumen-seconds and a peak emission intensity value of approximately 375,000,000 lumens, positioned at a distance of 12 inches from the negative. Examination of the negative shows the same excellent results as in Example I. The burned out element is employed on a commercial vertical flat-bed printing press. The resulting prints are of excellent quality.

*Example IV*

A half-tone image-bearing process negative is prepared by the procedure described in Example I from a photographic film as described in Example I. The negative is positioned and subjected to the short duration, high intensity source according to Example III, except that the negative is subjected to only two flashes. The resultant element and prints made therefrom have the same excellent characteristics and high qualities as obtained in the preceding examples.

*Example V*

Example III is repeated except that the negative is subjected to only one flash. The resultant element and prints made therefrom have the same excellent characteristics and high qualities as obtained in the preceding examples.

*Example VI*

Example III is repeated except that the negative is subjected to 8 flashes, each having a duration of approximately 1/800 of a second, at intervals of about 20 seconds, from a 4800 watt-second electronic flash unit having as a source a General Electric FT–623 tube with a rated energy value of 3,200,000 lumen-seconds and a peak emission intensity value of approximately 375,000,000 lumens, positioned at a distance of approximately 9 inches from the negative. The resultant element and prints made therefrom have the same excellent characteristics and high qualities as obtained in the preceding examples.

*Example VII*

Example VI is repeated except that a bank of four source tubes are used to subject the negative to three flashes, with results obtained similar to the preceding examples.

*Example VIII*

Example I is repeated except that the negative is subjected to eleven flashes, each having a duration of approximately 18 milliseconds, at intervals of about 10 seconds, from a 500 watt-second radiation source having an energy value of approximately 21,000 lumen-seconds and a peak emission intensity value of approximately 40,000,000 lumens, positioned at a distance of 1/2 inch from the negative on the base side of the negative. The resultant element and prints made therefrom have the same excellent characteristics and high qualities as obtained in the preceding examples.

*Example IX*

Example I is repeated except that the negative is subjected to one flash from a General Electric No. 22 flashbulb having a rated energy output of 63,000 lumen-seconds and a peak emission intensity value of approximately 4,000,000 lumens, with the bulb positioned at a distance of 1 inch from the negative on the emulsion side of the negative. The resultant element and prints made therefrom show satisfactory characteristics and qualities when used as the printing relief element in the printing press of Example III.

*Example X*

Example III is repeated except that the exposure is made through the base of the negative. The resultant element and prints made therefrom have the same excellent characteristics and high qualities as obtained in Example III.

*Example XI*

Example X is repeated except that the film base is polyethylene terephthalate, approximately 3 mils in thickness with results obtained similar to the preceding examples.

*Example XII*

Example III is repeated except that the film base is a pigmented copolymer of vinyl chloride and vinyl acetate, approximately 4 mils in thickness, with results obtained similar to the preceding examples.

*Example XIII*

Example III is repeated except that the film base is an aluminum sheet approximately 1/8 inch in thickness, with results obtained similar to the preceding example.

*Example XIV*

A photographic film having a layer of a gelatino-silver chloride/silver bromide emulsion with a silver-halide coating weight of 60 mg. per square decimeter and an emulsion thickness of 0.7 to 0.8 mil coated on a cellulose triacetate base is made to receive a latent positive image by contact exposure to a light source as described in Example I through a half-tone screen (88 lines per inch) and a continuous tone negative transparency of the desired image, followed by developing in a standard pyrocatechol-carbonate photographic hardening developer and fixing in a standard photographic fixer. The negative is placed emulsion side up on a flat surface. It is then subjected from above to 16 flashes from the radiation source described in Example I at a distance of 4 inches from the film. Examination of the resultant relief image element shows the gelatin emulsion at each half-tone dot to have burned out, resulting in holes corresponding to the dots forming the original developed silver half-tone image. The edges of these holes are sharp or clean cut, and the burn-out extends all the way to the triacetate support. The burned out process positive is employed as the printing element on a commercial vertical flat-bed printing press. The printing is by the intaglio method using gravure ink in the customary manner. Examination of the resulting print indicates the complete tonal range to be present.

*Example XV*

Example XIV is repeated except that the film base is polyethylene terephthalate, approximately 7 mils in thickness. The resultant element and prints made therefrom have the same excellent characteristics and high qualities as obtained in the preceding examples.

*Example XVI*

A photographic film having a synthetic hydroxyl polymer as the emulsion binding material as described in Jennings et al. U. S. Patent 2,397,864, Example I, is made to receive a latent negative image according to Example I above followed by development as described by Jennings et al. The film is subjected to a short duration, high intensity source as described in Example VI. The resultant element and prints made therefrom show the same excellent characteristics and high qualities as obtained in the preceding examples.

*Example XVII*

A photographic film as described in Carothers, U. S. Patent 2,216,735, Example I, having a synthetic linear polyamide as the base material, is processed according to Example I above, with results obtained similar to the preceding examples.

*Example XVIII*

Example III is repeated using four separate negatives, except that the negatives are positioned at distances from the radiation source respectively of 10, 15, 20 and 25 inches and subjected respectively to 10, 20, 38 and 55 flashes, with satisfactory results being obtained in each instance.

Various film structures of photographic elements which are known in the photographic art can be used to make the relief image elements of this invention. The film may be comprised of a layer of any suitable and conventional water-permeable colloid binder having dispersed therein light sensitive grains of silver halide, e. g., chloride and/or bromide or iodide, coated on a suitable film base.

A preferred water-permeable organic colloid binding agent for the silver halide grains is composed of gelatin, with or without an anti-halation dye or pigment therein. However, the water-permeaable binder can be agar agar, alginic acid, sodium alginate or a synthetic resin, e. g., polyvinyl alcohol, hydrophilic polyvinyl acetals, etc. The essential characteristic of the binder is that it be readily flash-combustible along with the developed silver image under subjection of the image to a short duration, high intensity source, but that the binder containing undeveloped silver be not readily flash-combustible under the same circumstances.

As it is well known in the art, the film base may be composed of any suitable hydrophobic sheet or pellicle, e. g., cellulose nitrate, cellulose triacetate, cellulose propionate, cellulose acetate butyrate; polyvinyl chloride, polyvinyl chloride/acetate; hydrophobic polyvinyl acetals, e. g., from formaldehyde and acetaldehyde, super polyesters from dicarboxylic acids and dihydric alcohols, e. g., oriented sheets of polyethylene terephthalates having melting points above 200° C. The film supports may be clear or may contain dyes or pigments. Suitable base materials also include metals, e. g., steel and aluminum plates, sheets and foils, as well as paper and impregnated closely woven fabrics; however, such films of necessity must be exposed to the radiation source from the emulsion side of the films.

Although it is not essential that the developed silver image-bearing element be treated with a photographic fixing solution prior to subjection to the short duration, high intensity source, such fixing treatment is preferred.

Generally speaking, increased press wear, i. e., relief image printing element durability, and improved image fidelity can be obtained by employing relatively thick emulsion layers, of the order of from one to three mils in thickness, or by additional image hardening by means of suitable processing solution before or after burn out. However, standard photographic films which have emulsion thicknesses typically under one mil are entirely satisfactory in the process of this invention.

The distance from the radiation source to the process element may vary from a negligible distance or contact up to 20 to 24 inches or further. The preferred distance is in the range from contact to approximately 10 inches since a relatively smaller number of flash exposures are required at shorter distances.

A half-tone image transparency is generally preferred to a line image transparency and, in general a higher energy radiation source is used with a corresponding decrease in total exposure time for the line image transparency.

The film may also have various other layers such as one or more subbing layers, and anti-abrasion or anti-halation layers which may or may not contain pigments or dyes in the usual manner.

The invention provides a simple process for producing relief image printing elements. An important advantage of the invention is that it permits the reproduction by printing of half-tone images without expensive plate making equipment. Another advantage is that a photographic element, such as a process negative or positive transparency, may be used directly to produce a relief image printing element without involving other photographic reproduction steps. Still another advantage is that the relief element is produced within a matter of seconds, compared with the much longer procedures of the prior art. Yet another advantage is that the vaporizing effect of the flash on the silver image results in no deposit or residue in the burned out areas which would require further treatment for removal.

The invention claimed is:

1. A process of preparing a relief image which comprises exposing a photographic element, said element comprising a developed silver image in a water-permeable organic binding agent, to the radiation of at least one short duration, high intensity source, said source positioned at a distance up to about 24 inches from said photographic element and characterized by an energy input from about 500 to 50,000 watt-seconds, a luminous energy output value from about 21,000 to about 33,000,000 lumen-seconds, a flash time duration from about 100 to 10,000 microseconds, and an emission of radiation of wavelength in the range from about 3,000 A. to about 26,000 A., whereby said silver image vaporizes leaving a depression where the image existed.

2. The process as set forth in claim 1 wherein said distance is under ten inches.

3. The process as set forth in claim 1 wherein said binding agent is gelatin.

4. The process as set forth in claim 1 wherein the emulsion layer of said photographic element is under about 3 mils in thickness.

5. The process as set forth in claim 1 wherein the base layer of said photographic element is polyethylene terephthalate.

6. The process as set forth in claim 1 wherein said image is a half-tone image.

7. A process of preparing a stencil printing element which comprises exposing a photographic stripping film, said film comprising a base and an emulsion layer containing a gelatin silver image in a water-permeable organic binding agent, to the radiation of at least one short duration, high intensity source, said source positioned at a distance up to about 24 inches from said photographic element and characterized by an energy input from about 500 to 50,000 watt-seconds, a luminous energy output value of from about 21,000 to about 33,000,000 lumen-seconds, a flash time duration of from about 100 to about 10,000 microseconds, and an emission of radiation of a wavelength in a range from about 3,000 A. to about 26,000 A., whereby said silver image vaporizes leaving a depression where the image existed, adhering said emulsion layer to a silk screen, and stripping the emulsion layer from the film base.

8. The process as set forth in claim 7 wherein said distance is under ten inches.

References Cited in the file of this patent

UNITED STATES PATENTS

| | | |
|---|---|---|
| 2,532,390 | Bennett et al. | Dec. 5, 1950 |
| 2,603,755 | De Ment | July 15, 1952 |